(12) United States Patent
Tsubouchi et al.

(10) Patent No.: US 6,865,174 B1
(45) Date of Patent: Mar. 8, 2005

(54) CODE DIVISION MULTIPLE ACCESS COMMUNICATION SYSTEM

(75) Inventors: Kazuo Tsubouchi, 30-38, Hitokita 2-chome, Taihaku-ku, Sendai-shi, Miyagi 982-0222 (JP); Kazuya Masu, Sendai (JP); Tomohiko Shibata, Kasugai (JP)

(73) Assignee: Kazuo Tsubouchi (JP)

( * ) Notice: Subject to any disclaimer, the term of this patent is extended or adjusted under 35 U.S.C. 154(b) by 0 days.

(21) Appl. No.: 09/601,886

(22) PCT Filed: Dec. 9, 1999

(86) PCT No.: PCT/JP99/06907

§ 371 (c)(1),
(2), (4) Date: Oct. 27, 2000

(87) PCT Pub. No.: WO00/35110

PCT Pub. Date: Jun. 15, 2000

(30) Foreign Application Priority Data

Dec. 9, 1998 (JP) .......................................... 10-350502

(51) Int. Cl.⁷ ............................................... H04B 7/216
(52) U.S. Cl. ........................ 370/342; 370/335; 370/515
(58) Field of Search ................................. 370/509, 512, 370/514, 343, 328, 203, 208, 441, 431, 329, 335, 342, 350, 503, 515; 375/140, 142, 143, 145, 149, 150, 151, 152, 153, 354, 363–368

(56) References Cited

U.S. PATENT DOCUMENTS

| | | | |
|---|---|---|---|
| 5,680,414 A | 10/1997 | Durrant et al. | 375/206 |
| 6,160,838 A * | 12/2000 | Shinohara et al. | 375/130 |
| 6,275,123 B1 * | 8/2001 | Tanaka et al. | 333/193 |
| 6,366,603 B1 * | 4/2002 | Uchida et al. | 375/136 |

FOREIGN PATENT DOCUMENTS

| | | |
|---|---|---|
| EP | 0 797 315 A2 | 9/1997 |
| JP | 3-167930 | 7/1991 |
| JP | 6-204971 | 7/1994 |
| JP | 7-16442 | 3/1995 |
| JP | 8-139637 | 5/1996 |
| JP | 9-261121 | 10/1997 |
| JP | 10-294715 | 11/1998 |

OTHER PUBLICATIONS

Milstein, Laurence B., et al., "Rapid Acquistion for Direct Sequence Spread–Spectrum Communications Using Parallel SAW Convolvers", IEEE Transactions on Communications, vol. COM–33, No. 7, Jul. 1985, pp. 593–600.

Engineering Science Society, "Proceedings of the 1996 Engineering Sciences Society Conference of IEICE", Sep. 18–21, 1996, Kanazawa University, cover page plus pp. 362–363.

* cited by examiner

Primary Examiner—Ajit Patel
(74) Attorney, Agent, or Firm—Parkhurst & Wendel, L.L.P.

(57) ABSTRACT

In a code division multiple communication system which prevents the dropout of a whole packet and does not require the generation of a carrier from a received signal, under bad communication path, by generating an orthogonal code with chip synchronization from a correlation peak of a synchronization code sequence output from a surface acoustic wave matched filter, a preamble division of a spectrum spread signal is composed of plural synchronization burst. Each synchronization burst is composed of a synchronization packet division having the Barker code of 11 chips and a dummy division. The period of one synchronization burst ($T_{burst}$) is set equally to the period of one symbol in a data division ($T_{symbol}$) which is modulated by the orthogonal sequential code of 64 chips. When the correlation peak of at least one from among plural synchronization code sequences is detected, the orthogonal code can be generated in accordance with the start timing of the first symbol in the data division.

24 Claims, 9 Drawing Sheets

Data Symbol Periode: $T_{symbol} = 64/11 \times 10^6 = 5.81 \mu sec$
Preamble Burst Periode: $T_{burst} = T_{symbol}$
Preamble Length: $T_{pre} = 10 \cdot T_{symbol}$
Data Length: $T_{data} = 500 \cdot T_{symbol}$
Packet Length: $T_{packet} = T_{pre} + T_{data} = 510 \cdot T_{symbol}$

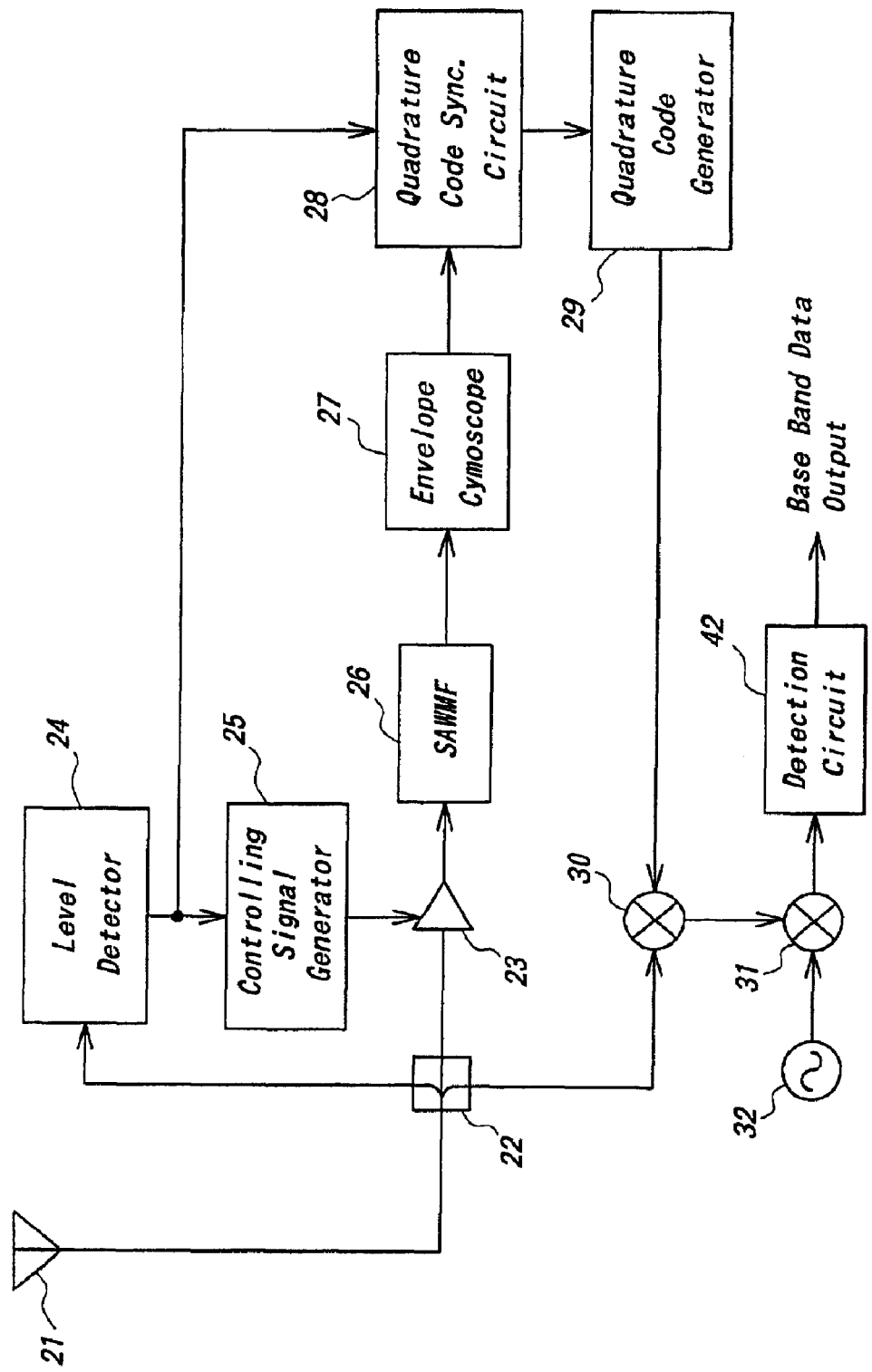

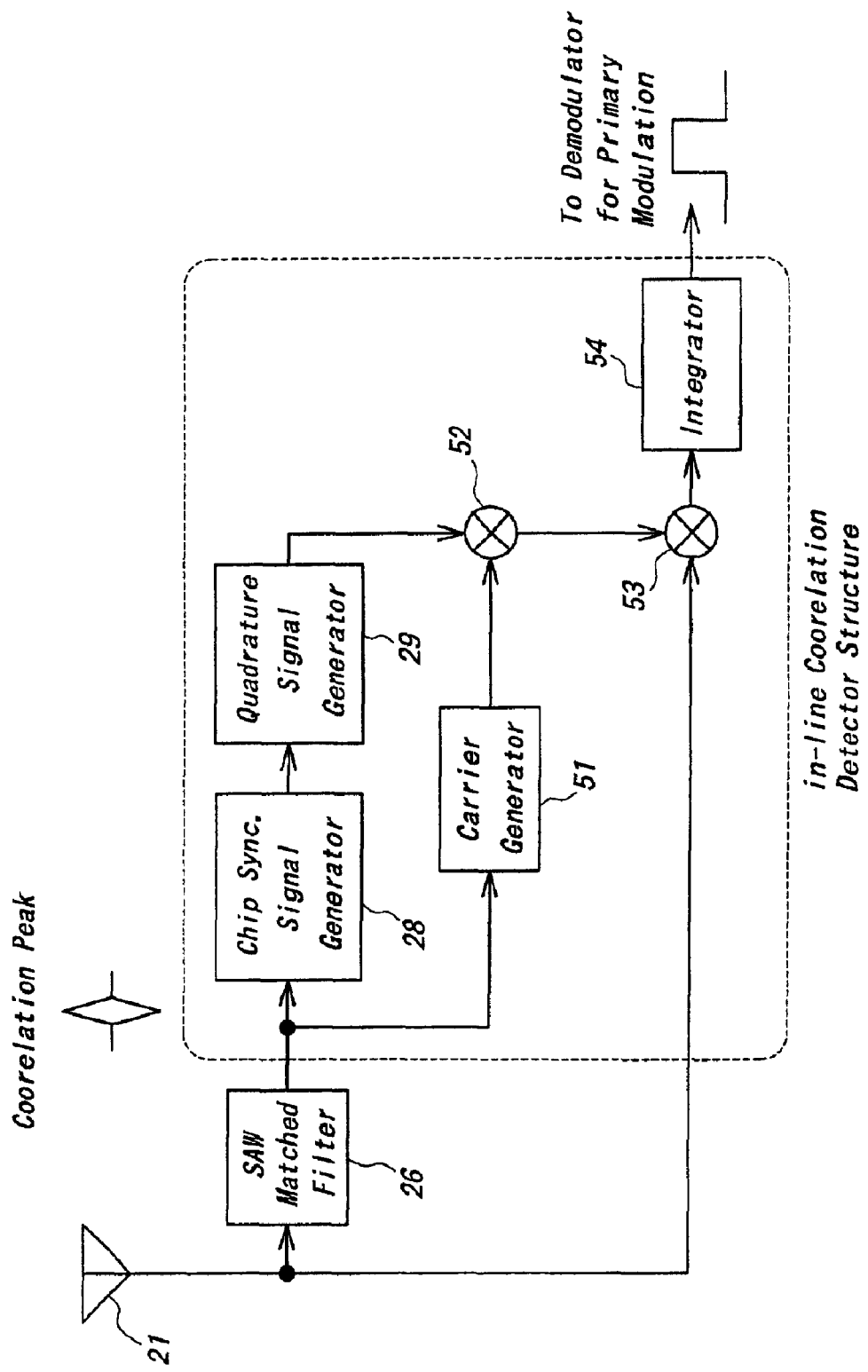

CODE DIVISION MULTIPLE ACCESS COMMUNICATION SYSTEM

TECHNICAL FIELD

This invention relates to Spread Spectrum Communication System, particular to Code Division Multiple Access Communication System which is capable of performing a high speed synchronization.

BACKGROUND ART

In advanced information community, communication technique, particularly, wireless communication technique is required to be developed. One of the wireless communication technique is that a base station (herein, called as a "transmitting station") provided in a cell (called as a "local area cell") having a radius of several hundred meter and plural mobile stations (called as a "receiving station") moving in the local area cell wirelessly communicate one another at the same time. In such a wireless communication, plural channels which do not interfere with one another must be installed. Therefore, as a multiple access system, Frequency Division Multiple Access (FDMA), Time Division Multiple Access (TDMA), Code Division Multiple Access (CDMA) or the like are suggested. This invention belongs to 'the Code Division Multiple Access (CDMA) in these multiple access systems.

The CDMA is also called "Spread Spectrum Communication (SSC) system because its frequency spectrum is spread by modulating baseband data with a high speed digital code. The SS-CDMA has excellent characteristics of fading-resistance, multipass-resistance and interference-resistance, and has distribution exchange function and position-determining function.

In this invention, a "down link" means a two-way transmission from a base station localized almost at the center of a cell to plural mobile stations in the cell. Hereinafter, a "transmitting station" means the base station, and a "receiving station" means the mobile station. In the down link of such a SS-CDMA (communication from the transmitting station to the receiving station), baseband data are multiplied by a carrier having a given center frequency in the transmitting station to generate a primary modulation signal, by which a spread code (pseudo-noise (PN) code) is multiplied to transmit a secondary modulation signal having a spread spectrum. In the receiving station, the same spread code and the same carrier as in the transmitting station are generated, and multiplied by the received signal to demodulate the original baseband data.

As a spread code in such a SS-CDMA communication system, an orthogonal code is employed to identify many channels and, for example, an orthogonal m-sequence code, an orthogonal Walsh code, an orthogonal Gold code or the like may be exemplified. In employing such an orthogonal code, the timing of the generation of a given orthogonal code in a receiving station is required to be synchronized with that in a transmitting station. This code synchronization is called as a "chip synchronization". Conventionally, in order to attain the chip synchronization, a digital sliding correlation apparatus or a digital matched filter is suggested.

The digital sliding correlation apparatus circulates the orthogonal code at a higher speed than a received signal, and attains the chip synchronization by a detector having a DLL (Delay Lock Loop). However, it is disadvantage that the digital sliding correlation apparatus becomes unstable in its operation due to the balance of the correlation apparatus and requires long time in synchronization acquisition because it has to circulate the code by maximum one period.

Moreover, the digital matched filter detects the correlation peak between a known orthogonal code and a received signal by correlation-integrating both of them using a shift resistor, and thereby, attains synchronization acquisition. Although the digital matched filter can attain the synchronization at a higher speed than the above digital sliding correlation apparatus, it may make the timing of the correlation peak ambiguous. Moreover, in the digital matched filter, as the number of the chips in the orthogonal code per period increases, the bits in the shift resistor increase, which results in the deterioration of the economical efficiency thereof.

The digital matched filter using a silicon integrated circuit technique generally operates in a baseband frequency, so that it can not operate when it includes a carrier frequency. Therefore, the received signal has to be input into the digital matched filter after synchronous detection, etc. Generally, a secondary modulated signal by a PN code has a spread spectrum, and has much difficulty in the synchronous detection due to its small C/N ratio. In principle, if a silicon integrated circuit using a microfabrication technique of 0.2–0.13 $\mu$m which is under development is employed, the digital matched filter which operates at around 100 Hz can be obtained. However, it is difficult to use the digital matched filter for the receiver of a mobile machine requiring a low electric power consumption because the silicon integrated circuit has a large-scale circuit which means that an electric power consumption is larger than at least 1 watt.

Moreover, it is disadvantage that the digital sliding correlation apparatus and the digital matched filter have large electric power consumption at stand-by state.

To solve the above problems, the present inventors suggest the following code division multiple access communication system. First, in a transmitter, a code division multiple signal which is composed of a data division obtained by multiplying an orthogonal code by a baseband and a preamble division to synchronize the orthogonal code in a receiver is transmitted. Second, in the receiver, the correlation peak is detected from the synchronized code sequence in the preamble division by an surface acoustic wave matched filter. At last, the orthogonal code is generated based on the detection timing, and the received baseband data in the data division is demodulated by the orthogonal code. Such a code division multiple access communication system is described in for example, Kokai Publication 9-261121(JP A 09-261121). Hereinafter, the surface acoustic wave matched filter is called as a "SAW MF". The "SAW MF" is abbreviated from the wording "Surface Acoustic Wave Matched Filter".

The above-mentioned code division multiple access communication system can synchronize the orthogonal code at a high speed. Moreover, the surface acoustic wave matched filter is a passive device, and has small electric power consumption, so that it can essentially provide a receiving station having a small stand-by electric power. Furthermore, since the surface acoustic wave matched filter can correlate the code sequence of surface acoustic wave matched filter with a code division multiple signal including a carrier, it can correlate in a GHz band or RF band if it can made of a suitable material for such bands. Therefore, since a received signal in a RF band is directly input and correlated in the surface acoustic wave matched filter, a pretreatment such as a down converting is not advantageously required. As described later, a SAW MF having an "aluminum nitride/ sapphire" structure including an aluminum nitride film is suitable for the SAW MF which can operate in the GHz band.

In the conventional code division multiple access communication system described in the above Kokai Publication 9-261121(JP A 09-261121), the preamble division is composed of a packet division for synchronization having a Barker code of 11 chips as a code sequence for synchronization and a dummy division of 5 chips next to packet division for the synchronization, and the data division is composed of n-sequential symbols of 1024 chips demodulated by the orthogonal code. As mentioned above, in the conventional code division multiple access communication system, there is the preamble division in the receiver in order to generate the synchronized orthogonal code with the chips in the data division of the received code division multiple signal. However, the code division multiple signal has only one code sequence for synchronization at the front of one packet, so that the packet can not be received entirely if the code sequence for synchronization is not detected. Since there are large influences resulted from various noises, multipass and cross talk between the adjacent cells in wireless communication, the correlation peak of the code sequence for synchronization can not be detected in good condition if the preamble division has only one code sequence for synchronization.

Moreover, in the conventional code division multiple access communication system, the receiver generates the carrier which is synchronized with the carrier of the code division multiple access signal made from correlation peaks, i.e. output signal from the surface acoustic wave matched filter, and combines the generated carrier with the orthogonal code generated as mentioned above, and demodulates the baseband data by multiplying the combined signal by the received signal. The synchronized carrier with received carrier in phase and frequency can be reproduced, in the period when the correlation peak of the surface acoustic wave matched filter appears. However, the communication circuit is required to be devised to reproduce the carriers in the short period when the correlation peak appears. Therefore, the circuit structure using a simple method is desired.

It is a first object of the present invention to provide a code division multiple access communication system which can attain the chip synchronization in the code sequence for synchronization precisely at a high speed even under a bad communication environment, and thus, can remove the disadvantage of being incapable of receiving the packet entirely.

It is a second object of the present invention to provide a code division multiple access communication system which can demodulate the baseband data precisely from the correlation peak of the surface acoustic wave matched filter without the carrier synchronized to the received signal, in addition to realizing the first object.

This invention relates to a code division multiple access communication system in which in a transmitter, a code division multiple access signal, composed of a data division obtained by multiplying a baseband data and an orthogonal code and a preamble division including synchronization code sequences to attain the chip synchronization of the orthogonal code in a receiver, is modulated with a carrier having a given center frequency and transmitted, and in the receiver, a correlation peak is detected, from among the synchronization code sequences in the preamble division by a surface acoustic wave matched filter and the baseband data in the data division is demodulated by the orthogonal code generated on the detection timing, wherein the preamble division has plural synchronization code sequences, and the surface acoustic wave matched filter detects the correlation peak of at least one from among the plural synchronization code sequences and generates the orthogonal code on the detection timing of the correlation peak.

According to the code division multiple access communication system of the present invention, the orthogonal code with the chip synchronization can be generated if at least one of the plural synchronization code sequence in the preamble division of the transmitted signal can be detected by the surface acoustic wave matched filter, which prevents the dropout of the whole packet.

As mentioned above, even if the preamble division has the plural synchronization code sequences, the surface acoustic wave matched filter can not always detect the correlation peaks of all the synchronization code sequences. Thus, even if all the same synchronization code sequences are employed, the timing of the generation of the orthogonal code can not be estimated from the detected correlation peaks. That is, if the preamble division has 10 synchronization code sequences for example, the surface acoustic wave matched filter detect the correlation peaks from all the 10 synchronization code sequences at every detection thereof in an idealistic condition. If only 9 synchronization code sequences are detected due to the deterioration of the communication path, generally, the starting time of the first symbol in the data division can not be estimated from the correlation peaks of these 9 synchronization code sequences. To solve such a problem, it is preferable to realize the synchronization code sequence corresponding to the correlation peak by changing the construction of the plural synchronization code sequences, but it results in the complication of the construction of the transmitter or the receiver.

In this invention, for ironing out this problem, it is preferable that in a code division multiple access communication system in which in a transmitter, a code division multiple access signal, composed of a data division obtained by multiplying a baseband data and an orthogonal code and a preamble division including synchronization code sequences to attain the chip synchronization of the orthogonal code in a receiver, is modulated with a carrier having a given center frequency and transmitted, and in the receiver, a correlation peak is detected from among the synchronization code sequences in the preamble division by a surface acoustic wave matched filter and the baseband data in the data division is demodulated by the orthogonal code generated on the detection timing, the period of the synchronization burst in the preamble division ($T_{burst}$) which is composed of a synchronization packet division having at least one synchronization code sequence and a dummy division next to the packet division, is set equally to the integral multiples of the period of one symbol in the data division ($T_{symbol}$). In particular, it is most preferable that $T_{burst}$ is equal to $T_{symbol}$ in the data division.

According to the preferred code division multiple access communication system, in the case that the preamble division has 10 synchronization code sequences having the same structure, for example, if at least one correlation peak from among the synchronization code sequences is detected, the orthogonal code can be generated, in accordance with the start timing of the first symbol in the data division.

Moreover, in this case, the orthogonal code can be generated on the timing of the first detection of the correlation peak from the synchronization code sequences in the preamble division, and the operation of the orthogonal code generating circuit can be reset at every detection of the correlation peaks as described later in an embodiment. Since the latter case can generate the orthogonal code on the timing much near the start timing of the data division, it may attain the chip synchronization more precisely.

Moreover, the present invention to realize the second object as mentioned above relates to a code division multiple access communication system in which in a transmitter, a code division multiple access signal, composed of a data division obtained by multiplying a baseband data and an orthogonal code and a preamble division including synchronization code sequences to attain the chip synchronization of the orthogonal code in a receiver, is modulated with a carrier having a given center frequency and transmitted, and in the receiver, a correlation peak is detected from among the synchronization code sequences in the preamble division by a surface acoustic wave matched filter and the baseband data in the data division is demodulated by the orthogonal code generated on the detection timing, wherein in the receiver, the orthogonal code which is generated on the detection timing of the correlation peak in the surface acoustic wave matched filter is multiplied by the received code division multiple signal to generate a narrow-band modulation signal, and the generated narrow-band modulation signal is demodulated by a carrier generated from a local oscillator provided in the receiver to reproduce the original baseband data.

In a preferred embodiment of the code division multiple access communication system according to the present invention, the carrier having the frequency equal to the center frequency of the carrier generated in the transmitter is generated, and is multiplied by the narrow-band modulation signal to demodulate the baseband data.

Moreover, the carrier having a different frequency from the center frequency of the carrier generated in the transmitter is generated, and the narrow-band modulation signal having their differential frequency is generated by multiplying the generated carrier and the narrow-band modulation signal. Then, the narrow-band modulation signal having their differential frequency is demodulated and thereby, the baseband data is demodulated. This system is called a "Heterodyne system".

In both cases, normal demodulation system may be employed in reproducing the baseband data by demodulating the narrow-band modulation signal.

Furthermore, in the present invention, it is ascertained that when the repeated number $N_{burst}$ in the plural bursts constituting the preamble division is set to 5–15, particularly 6–12, the probability of the dropout of the whole packet due to not attaining the chip synchronization is much less than that of the conventional code division multiple communication access system.

In this invention, it is preferable that the chip rate of the synchronization code sequence in the preamble division is higher than the chip rate of the orthogonal code in the data division, particularly, integral times of not less than two as high as the chip rate of the orthogonal code in the data division. In this case, since the correlation peak output from the surface acoustic wave-matched filter is sharper in terms of time, the generation timing of the orthogonal code can be defined more precisely.

As mentioned above, as the synchronization code sequence in the preamble division, the Barker code of 11 chips, the M-sequential code or the like may be employed, and as the orthogonal code in the data division, the orthogonal m-sequential code, the orthogonal Walsh code, the orthogonal Gold code or the like may be employed.

BRIEF DESCRIPTION OF THE DRAWINGS

FIG. 7 is a block diagram showing the construction of another mobile station in the code division multiple access communication system of the present invention, FIG. 8 is a block diagram showing the construction of still another mobile station in the code division multiple access communication system of the present invention.

BEST MODE FOR CARRYING OUT THE PRESENT INVENTION

The explanation of the present invention referring to the attaching drawings will be preceded by the definitions of the technical terms in this specification.

Code Division Multiple Signal Packet

A packet composed of one preamble division provided at the head thereof and a data division having plural symbols next to the preamble division.

Packet Period ($T_{packet}$)

A period composed of the preamble division and the data division Data rate D [bps(bit per second)].

A bit number per second of baseband data composed of binary signal [1,0].

Symbol Period ($T_{symbol}$)

A period of the symbol in the data division.

Synchronization Burst

A signal section composed of a synchronization packet division having at least one synchronization code sequence and a dummy division next to the synchronization packet division.

Synchronous Burst Period ($T_{burst}$)

A period of the synchronization burst.

Chip Length N [Chip]

In a SS system or a CDMA system, a PN code is multiplied and secondarily modulated. The PN code is composed of given repeated [1] and [0] codes. The number of the [1] and [0] codes is a "chip length". Generally, if an orthogonal code of N chips is employed, a N channel-communication can be carried out when the orthogonal code or chip is synchronized.

Chip Rate $R_{chip}$ [cps (Chip Per Second)]

A chip rate is a transmission rate of a chip constituting a synchronization code sequence and an orthogonal code. The chip rate of the synchronization code sequence in the preamble division is called as a "$R_{pre}$", and the chip rate of the orthogonal code in the data division is called as a "$R_{data}$". In the data division, the relation of $R_{data}/N=D$ is satisfied.

Figure 1:
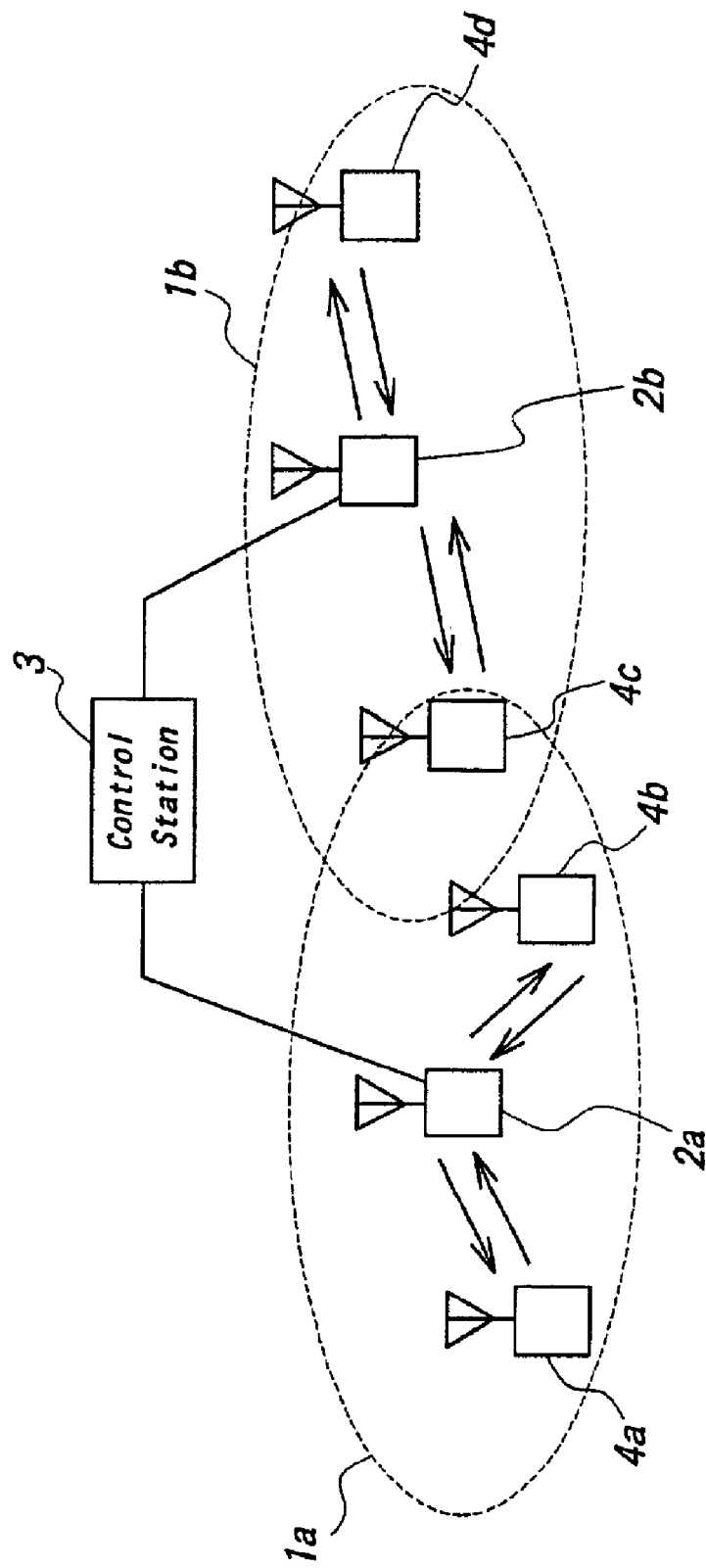
FIG. 1 is a diagrammatic view showing entirely the construction of the code division multiple access communication system of the present invention.

FIG. 1 diagrammatically shows the construction of the cell-network using the code division multiple access communication system of the present invention. Base stations 2a and 2b are provided in for example, local area cells 1a and 1b having a radius of about 150 m, and are connected to a control station 3 via for example, optical fibers. Plural mobile stations 4a, 4b . . . can move in the local cells 1a and 1b freely, and the base stations 2a and 2b detect constantly which mobile station moves to the local area cell to which the base stations belongs. Each of mobile stations 4a, 4b . . . communicates with the base stations 2a and 2b. The communication for the base station from the mobile station is called as a "up link", and the communication for the mobile station from the base station is called as a "down link". In the down link, the base station transmits signals to the mobile station in the same cell at the same timing, and the mobile station selectively demodulates the signals for itself from among the transmitted signals. As mentioned above, this invention relates to the down link technique. For enhancing the usability of the cell-network, it is important to set as many channels as possible in one cell. In this invention, for realizing this object, the baseband data are demodulated by the orthogonal code having a chip length N.

Generally, since in the down link, it is easy to transmit signals for a mobile station from a base station, the packet construction of the present invention can be easily employed for the down link. In the up link for a base station from a mobile station, even if the mobile stations transmits signals at the same timing, the timings of the signals which reach the base station from the mobile stations does not coincide with one another. However, if the signals from every mobile station can be transmitted to the base station at the same timing by some kind of method, the packet construction of the present invention can be applied for the up link.

Figure 2:
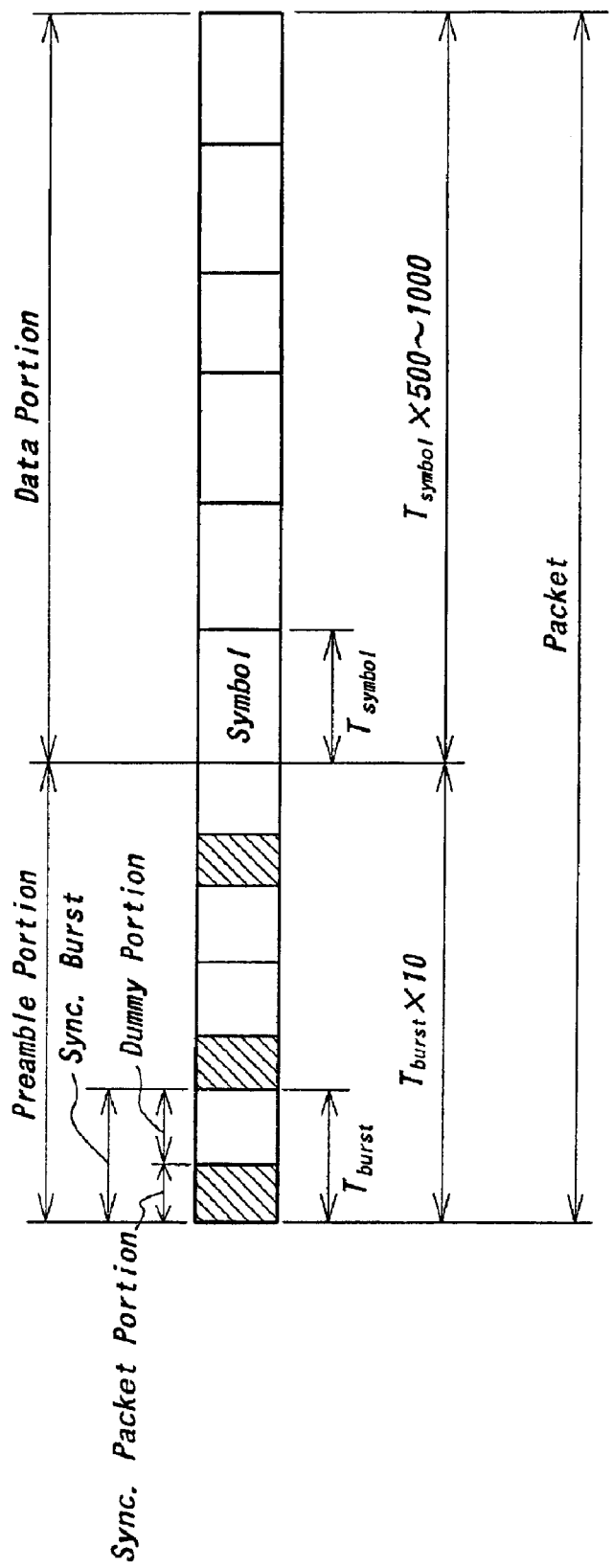
FIG. 2 is a diagrammatic view showing an embodiment of the construction of a code division multiple access communication system in the code division multiple communication system of the present invention.

FIG. 2 is a diagrammatic view showing the construction of a code division multiple access signal packet in the code division multiple access communication system of the present invention. The code division multiple signal packet has a preamble division including plural synchronization code sequences to perform the chip synchronization and a data division including the baseband data demodulated by an orthogonal code. The preamble division has plural repeated synchronization burst which has synchronization packet division including the synchronization code sequences and dummy division next to the synchronization packet division.

For the synchronization packet division in the synchronization burst division, the Barker code of 11 chip is transmitted in the after-mentioned example. No signal may be transmitted for the dummy division. In the above transmission, since no electric power is transmitted for the dummy division, the integral electric power in the whole packet can be advantageously repressed. In the following embodiment, for repressing the integral electric power of the whole packet and simplifying the packet construction, no signal is transmitted to the dummy division. In the case of transmitting no signal in the dummy division, the SAW MF does not output the correlation peak, so that it does not influence the operation as described later. Signals of code "1" or "0" may be transmitted in the dummy division in sequence. Moreover, a signal of the code by which the SAW MF in the receiver does not output the correlation peak may be transmitted to the dummy division.

The synchronization code sequences which are repeated plural times in the preamble division are Pseudo Random Noise Codes, which may be composed of m-sequential codes, Barker codes, Gold codes or the like, for example. In this embodiment, the Barker code of 1 chips having the code construction of [11100010010] is used. The data division is composed of the baseband data modulated by the orthogonal code, which may be composed of the orthogonal m-sequential code, the orthogonal Gold code, the orthogonal Walsh code or the like. The channel number is determined by the chip length N of the orthogonal code, and in this embodiment, the orthogonal m-sequential code of 64 chips is employed. Although the orthogonal m-sequential code of 64 chips gives 63 channels actually, for convenience of explanation, it gives 64 channels.

As mentioned above, the synchronization code sequences in the preamble division are composed of the Barker codes of 11 chips. Then, when the repeated number is set to 5–15, particularly, 6–12, the chip synchronization can be attained precisely, and in this embodiment, the repeated number is set to 10.

It is ascertained that the above repeated number enables the chip synchronization to be achieved in bad communication path.

The number of the symbol in the data division may be determined freely if the protocol restriction is not considered, but in a real case, the symbol number is set to 500–1000, in consideration of the stability of a quartz oscillator and the Doppler shift due to the movement of the mobile station. The reason is that even if the generation timing of the orthogonal code is detected precisely and thereby, the orthogonal code is generated, for example, the chip rate of the orthogonal code to be generated in a receiver is different from that of the received signal because the chip rate is generated in the receiver independently. Even if the mobile station remains stationary, the chip rate of the orthogonal code to be generated in the receiver is different from that of the received signal by several ppm to 10 ppm. Therefore, if extremely long data are transmitted, the chip synchronization can not be achieved in both the front and rear of the data division at the same time. Even if the chip rate can be reproduced precisely in the receiver, it is shifted due to the Doppler shift thereof when the mobile station is moved. In the embodiment, when the difference between the chip rate of the received signal and the chip rate to be generated in the receiver was about 5–10 ppm, the data error due to the chip synchronization was not considerable substantially in the transmission of the packet of 500–1000 symbols.

As described later, in the case of transmitting the code division multiple access signal packet shown in FIG. 2 practically, the packet is multiplied by the carrier having a center frequency of $f_0$. The carrier center frequency $f_0$ is set to 2.484 MHz in consideration of the rule of Radio Law, and the band width is set to the range of 26 MHz-width. In this case, the rule of RCR STD-33 is considered. In view of the rule, the chip rate of the code division multiple access signal packet ($R_{chip}$) is determined. In this embodiment, the chip rate of the synchronization code sequence in the preamble division ($R_{pre}$) is set to 22 cps, and the chip rate of the orthogonal code in the data division ($R_{data}$) is set to 11 Mcps, which is half as large as the chip rate $R_{chip}$. As mentioned above, since the chip length is set to 64 chips, the data rate D of the data division is set to about 171 kbps from the equation $R_{data}/N=D$. As is apparent from the equation, as the chip length N is increased, the chip rate $R_{data}$ is decreased, and as the chip length N is decreased, the chip rate $R_{data}$ is increased.

For attaining the chip synchronization more precisely, it is desired that the chip rate of the synchronization code sequence in the preamble division ($R_{pre}$) is larger than the chip rate of the orthogonal code in the data division ($R_{data}$). The reason will be described hereinafter. In the correlation peak output from the SAW MF, the envelope curve has a triangular wave-like shape in the wave-profile with time. The time-period of the triangular wave is the reciprocal number of the chip rate $R_{pre}$. When the chip rate $R_{pre}$ is set to 22 Mcps, the time-period is set to about 45 nsec. Since the generation timing of the orthogonal code is detected by taking advantage of the triangular wave-profile, the finite time-period of 45 nsec generates an error on the generation timing of the orthogonal code. As the period of the orthogonal code per chip is longer, the finite time-period of 45 nsec does not influence the generation timing. Therefore, in the case that the chip rate of the synchronization code sequence in the preamble division ($R_{pre}$) is larger than the chip rate of the orthogonal code in the data division ($R_{data}$), the chip synchronization can be attained precisely.

Although the ratio of the chip rate $R_{pre}$ to the chip rate $R_{data}$ is freely selected in principle, it is preferably set to an integral number for designing and fabricating the communication circuit easily.

In this embodiment, since the synchronization code sequence in the preamble division is composed of the Barker code of 11 chips, the period of the synchronization packet division is set to 500 nsec from "(1/22 Mcps)×11 chips". On the other hand, since in the data division, the orthogonal m-sequential code is employed, the period of one symbol ($T_{symbol}$) is set to about 5.8 $\mu$sec from "(1/11 Mcps)×64 chips". This invention is also characterized in that the period of the synchronization burst in the preamble division ($T_{burst}$) is integral times as long as the period of the symbol in the data division ($T_{symbol}$). However, in this embodiment, the $T_{burst}$ is set to be equal to the $T_{symbol}$, and the period of the dummy division is determined so as to satisfy the condition. As mentioned above, since the $T_{symbol}$ is equal to the $T_{burst}$, $T_{burst}$ is set to about 5.8 $\mu$sec. The period of the synchronization packet division is set to 500 nsec(=0.5 $\mu$sec), the dummy period in the synchronization packet division is set to "about 5.8 $\mu$sec–0.5 $\mu$sec=about 5.3 $\mu$sec".

Figure 3:
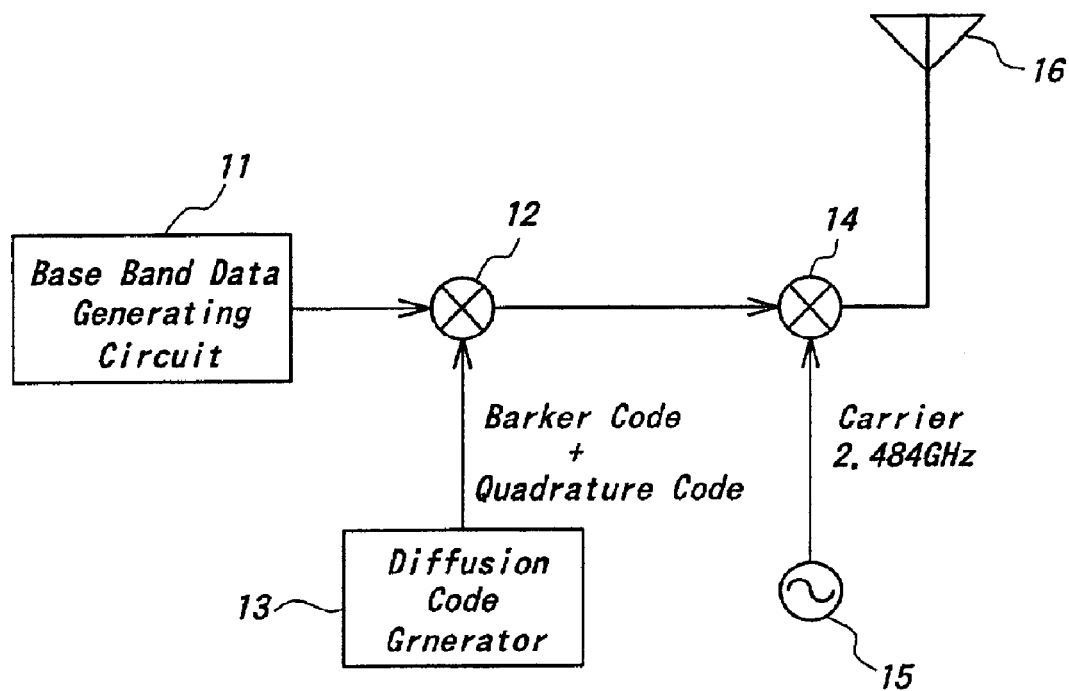
FIG. 3 is a block diagram showing the construction of a base station in the code division multiple access communication system of the present invention.

FIG. 3 is a block diagram showing the construction of base stations (transmitting stations) 2a and 2b, which is similar to a conventional one. That is, a baseband data to be transmitted from the baseband data-generating circuit 11 is supplied to a first multiplier 12, and then, the Barker code sequence of 11 chips and the orthogonal m-sequential code of 64 chips which are output from a spread signal-generating circuit 13 at a given timing are supplied to the multiplier 12, to generate the code division multiple access signal packet shown in FIG. 2. The thus generated code division multiple access signal packet is supplied to a second multiplier 14 and is multiplied by the carrier output from a carrier-generator 15, and then, the thus obtained output is transmitted via an antenna 16. The carrier has the center frequency $f_0$ of 2.484 MHz, as mentioned above. In the embodiment shown in FIG. 2, the baseband data is multiplied by the spread code and the carrier in turn, but the multiplying turn may be reversed. That is, the baseband data may be multiplied by the carrier and the spread code in turn. Mathematically, the multiplication give the same result irrespective of the multiplying turn. However, since many circuits to treat 2.4 GHz band-signals are required in a transmitter if the baseband data is multiplied by the carrier firstly, it is difficult to shield high frequency signals disadvantageously.

Figure 4:
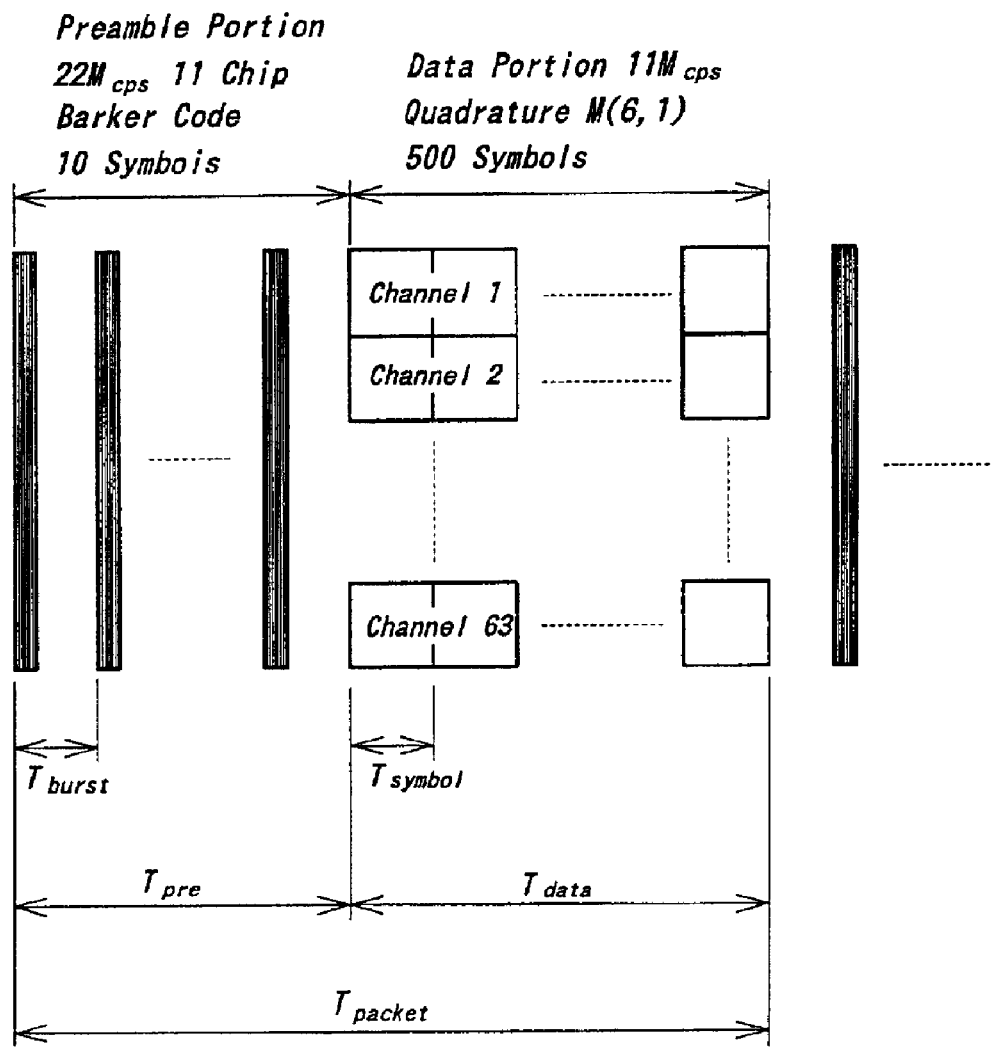
FIG. 4 is a diagrammatic view showing a transmission signal from the base station.

FIG. 4 shows diagrammatically a code division multiple access communication signal from the base stations 2a or 2b. As mentioned above, the preamble division has 10-repeated synchronization bursts, each being composed of the synchronization packet division and the data division. Since in the data division, the baseband data is modulated in spread spectrum by the orthogonal m-sequential code of 64 chips, one data packet includes code division multiple access signals of 500 symbols corresponding to 63 channels of channel 1 to channel 63. FIG. 4 shows diagrammatically that the preamble divisions are transmitted to the 63 channels in common. As mentioned above, the period of the synchronization burst in the preamble division ($T_{burst}$) is the same as the period of the symbol in the data division ($T_{symbol}$)

Figure 5:
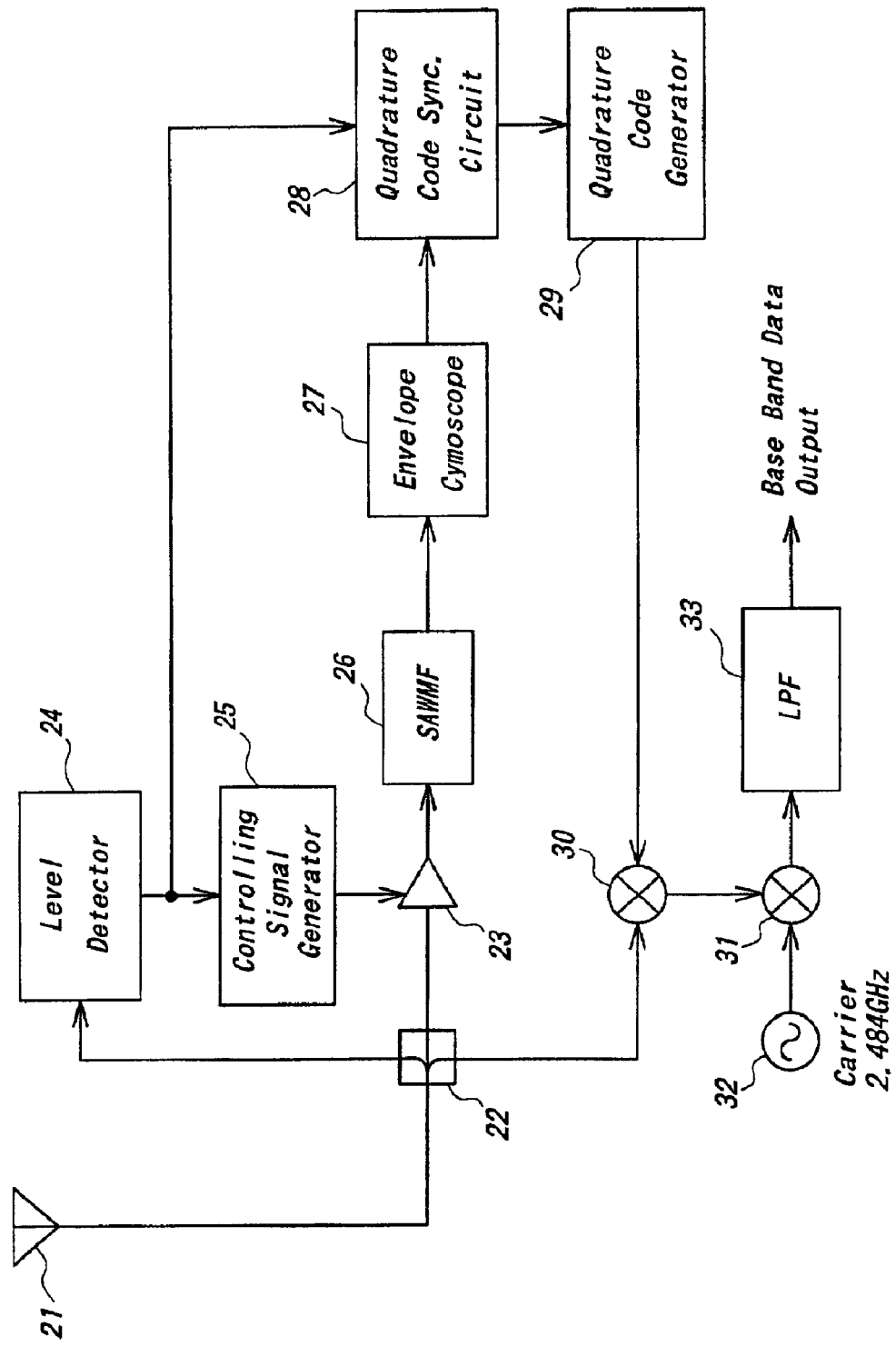
FIG. 5 is a block diagram showing the construction of a mobile station in the code division multiple access communication system of the present invention.

FIG. 5 shows a construction of mobile stations (receiving stations) 4a, 4b In the conventional code division multiple access communication system in the above Kokai Publication 9-261121(JP A 09-261121), the mobile station detected the carrier included in the correlation peak from the surface acoustic wave-matched filter (SAW MF) and generated the carrier synchronized with the carrier of the received signal. Then, the combined signal of the generated carrier and the synchronization code sequence was multiplied by the received signal to reproduce the original baseband data. Since the correlation peak from the surface acoustic wave matched filter (SAW MF) has a short period of 500 nsec, it is actually very difficult to reproduce the carrier from the received signal precisely in the short period. This invention does not require to reproduce the carrier from the received signal.

The mobile station branches the code division multiple signal received at an antenna 21 by a branching filter 22, and one of the branched signals is supplied to a gain-variable amplifier 23. A level detector 24 detects, when the signal branched by the branching filter 22 is received, the electric power level of the received signal. A controlling signal generator 25 generates, when the output signal of the level detector 24 is received, a controlling signal, which is supplied to the amplifier 23 as a gain controlling signal. These circuits constitutes an automatic gain controlling circuit, and the amplifier 23 output a signal of a given level constantly. In FIG. 5, the received signal is directly input into the level detector, but the signal from the rear end of the SAW MF, that is, from between the SAW MF 26 and the enveloped cymoscope 27 is directly input into the level detector. Herein, the level detector 24, the controlling signal generator 25 and the gain-variable amplifier 23 may not be provided, depending on the use of the code division multiple access communication system. However, it may trouble the signal treatment after the enveloped cymoscope 27.

The output signal from the amplifier 23 is supplied to the surface acoustic wave-matched filter (SAW MF) 26, and the synchronization code sequence in the preamble division is detected. Since the surface acoustic wave-matched filter 26 is well known, the explanation for the filter 26 is omitted. The SAW MF is described in Kokai Publication 9-261121 (JP A 09-261121).

Moreover, in H. Nakase, T. Kasai, Y. Nakamura, K. Masu and K. Tsubouchi, "One Chip Demodulator Using RF Front-End SAW Correlator for 2.4 GHz Asynchronous Spread Spectrum Modem", The 5th International Symposium on Personal Indoor and Mobile Radio Communications (PIMRC'94), The Hague, 374-378 (1994), the SAW MF having an aluminum nitride/sapphire-structure, which is usable for this invention, is described. The SAW MF having the aluminum nitride/sapphire-structure operates at high acoustic wave velocity, and has zero temperature coefficient-propagation delay time characteristic. The line & space of the IDT (Inter Digital Transducer) electrode in the SAW MF having an operation center frequency of 2.4 GHz is set to 0.6 $\mu$m, and can be fabricated easily by a present microfabrication technique. If the SAW MF having the center frequency of 2:4 GHz is made of another material, the line & space of the IDT is set to 0.20.3 $\mu$m, and have difficulty in being fabricated by the microfabrication technique. The surface acoustic wave matched filter, which outputs the correlation peak from the directly inputting spectrum spread signal of 2.4 GHz band, has preferably the aluminum nitride/sapphire-structure, but it may have another structure. Not considering the electric power consumption of the receiver, the matched filter based on a Si ULSI technique may be employed.

When the surface acoustic wave matched filter 26 detects the synchronization code sequence, it outputs the correlation peak. Then, the correlation peak is supplied to the enveloped cymoscope 27, and the thus obtained output is supplied to the orthogonal code synchronization circuit 28. The thus obtained output is supplied to the orthogonal code-generating circuit 29 to generate the orthogonal code synchronized with the synchronization code sequence, that is, the orthogonal code with the chip synchronization.

In the embodiment shown in FIG. 5, the detection of the correlation peak is performed by the enveloped cymoscope, but may be done by another method only if the method can detect the generation timing of the correlation peak. In brief, the generation timing of the correlation peak has only to be detected. A delay demodulation circuit may be employed, although the use of the circuit complicates the construction of the synchronization code sequence and makes the construction of the receiver complex to some degree.

In this embodiment, the orthogonal code generated, as mentioned above, in the orthogonal code-generating circuit 29 is supplied to a first multiplier 30, and is multiplied by the spectrum spread signal branched at the branching filter 22. As a result, the narrow-band modulation signal can be obtained.

Figure 6A:
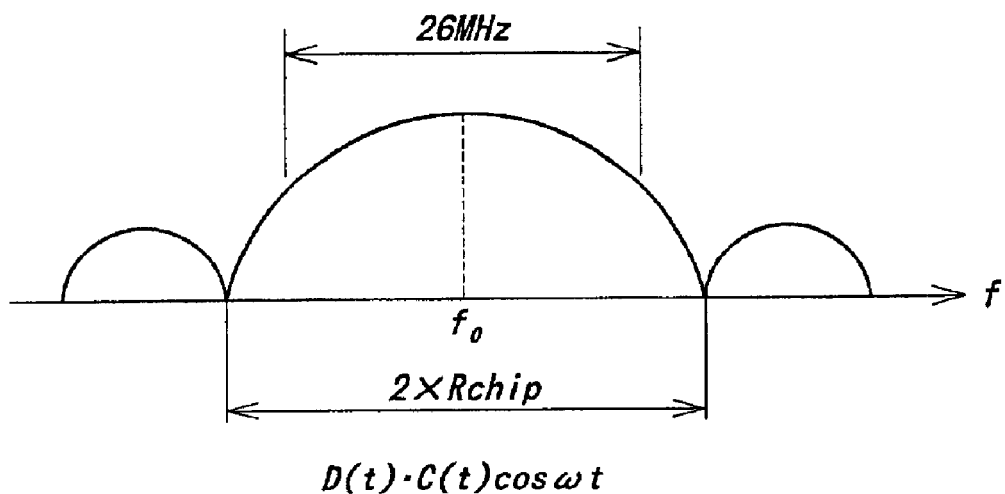
FIGS. 6A and 6B are diagrammatic views showing a spectrum spread signal and a narrow-band modulated signal, respectively.
Figure 6B:
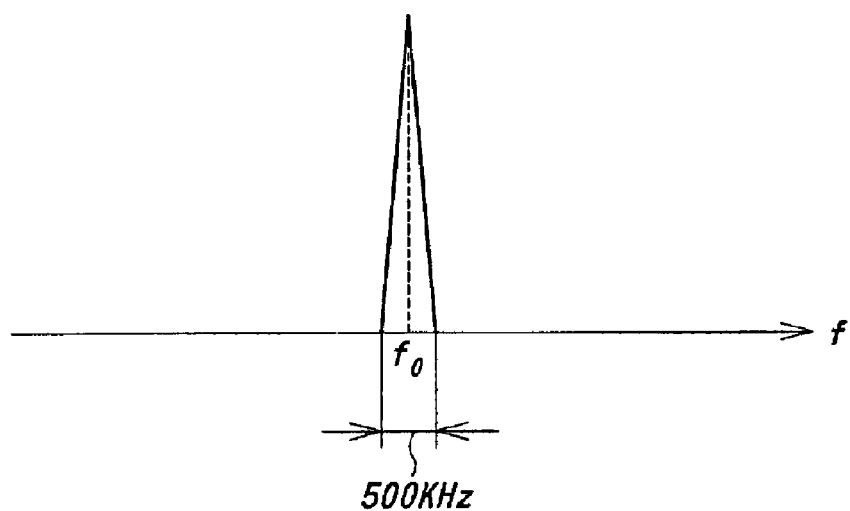

FIG. 6A shows schematically the spectrum spread signal which is supplied to the first multiplier 30, and FIG. 6B shows schematically the narrow-band modulation signal output from the first multiplier 30. Herein, the baseband data, the carrier, the orthogonal code and the spectrum spread signal are represented by "D(t)", "cos $\omega$t", "C(t)" and "D(t)·C(t)cos $\omega$t, respectively.

Generally, when the baseband data is modulated in BPSK (Bi-Phase Shift Keying), the D(t) is set to "1" and "−1" at the baseband data=1 and −1, respectively. Moreover, the secondary modulation to multiple the orthogonal code is performed by a PSK modulation, the C(t) is set to "1" and "−1" at the orthogonal code=1 and 0, respectively. For example, when the code sequence of 11 chips is set to [11100010010], the C(t) is set to [+1,+1,+1,−1,−1,−1,+1,−1,−1,+1,−1]. When the carrier frequency is set to $f_0$, the equation $\omega 2\pi f_0$ is satisfied. The spectrum of "D(t)·C(t)cos $\omega$t has a central wave having a two times as large band width as the chip rate at the carrier center frequency $f_0$ and sideband waves at both sides of the central wave. When the spectrum spread signal is transmitted under the rule of RCR-STD 33, the electric power spectrum is repressed so that the sideband wave can satisfy the rule. By multiplying the spectrum spread signal and the orthogonal code with the chip synchronization, the signal of D(t)cos $\omega$t can be obtained. The signal is a narrow-band modulation signal, and has a center frequency equal to the carrier center frequency $f_0$ and a small band width of about 500 kHz.

In this embodiment, the thus obtained narrow-band modulation signal is supplied to a second multiplier 31, and is multiplied by the carrier having a frequency of 2.484 GHz which is generated from a carrier generator 32, to be demodulated. The thus obtained output is passed through a low path filter 33, and the baseband data can be reproduced. The technique to demodulate the above narrow-band modulation signal is well known, and by generating the carrier synchronized with that of the received signal at the carrier generator 32 by a method according to the technique, the baseband data can be demodulated.

Herein, the concrete numerical value of the data rate of the down link in this invention is exemplified. The number of the synchronization burst in the preamble division is set to 10, and the chip rate $R_{pre}$ of the synchronization packet division (synchronization code sequence) in the synchronization burst is set to 1 chip-Barker code of 22 Mcps. Then, the orthogonal code in the data division is composed of the orthogonal m-sequential code of 64 chips, and the chip rate of the orthogonal code in the data division ($R_{data}$) is set to 1 Mcps. In this case, the period of the symbol in the data division ($T_{symbol}$) is set to (1/11 Mcps)×64=5.8 $\mu$sec. The number of the symbol in the data is set to 500. The total sum of the preamble division and the data division, that is, the packet length is set to 510×$T_{symbol}$=2.96 $\mu$sec. Since the data of 500 symbols are transmitted per one packet, the real data rate per one packet is (500/2.96 msec)=168 kbps. This data rate corresponds to that of an incontinent transmission of packet. In the transmission and the reception using TDD (Time division Duplex) at the up link and down link, if the periods of the transmission and the reception in the up link and the down link are divided equally, respectively, the real data rate at the down link is set to 84 kbps, half of the above real data rate of 168 kbps. It has to be emphasized that the channel number is 64 and the data rate of each data rate is 64 kbps.

FIG. 7 is a block diagram showing another mobile station usable for the code division multiple communication system of the present invention. The same reference is given to the same part in FIG. 7 as the one in FIG. 5. In the above embodiment, the carrier generator 32 generates the carrier having the same frequency as the carrier of the received signal, that is, the carrier having the center frequency of 2.484 GHz. In this embodiment, however, a carrier generator 41, which generates a carrier having a different frequency from the carrier frequency of the received signal, is provided. Then, by multiplying the generated carrier and the above narrow-band modulation signal with the second multiplier 31, the narrow-band modulation signal, having the center frequency equal to the differential frequency between their carrier frequencies, is obtained. Lastly, the obtained narrow-band modulation signal is detected by a detecting circuit 42 to demodulate the baseband data. This modulation system is called as a "Heterodyne system". Since the Heterodyne system is well known, the detail explanation is omitted.

FIG. 8 is a block diagram showing a still another mobile station usable for the code division multiple access communication system of the present invention. In this embodiment, the same reference is given to the same part. As mentioned in Kokai Publication 9-261121(JP A 09-261121), the carrier included in the correlation peak from the surface acoustic matched filter 26 is detected and reproduced, and the combined signal of the reproduced carrier and the orthogonal code is multiplied by the spectrum spread signal to demodulate the original baseband data.

Figure 9A:
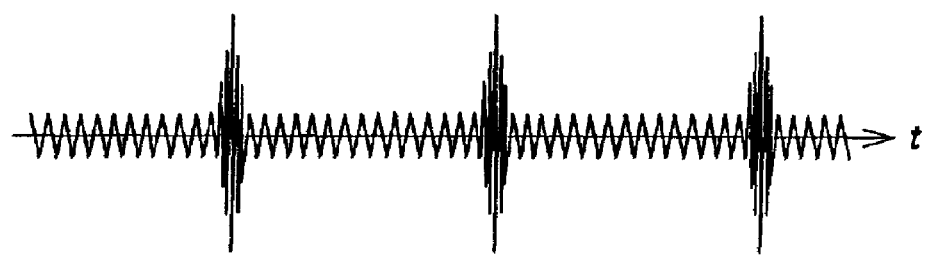
FIGS. 9A and 9B are diagrammatic views showing an extracting operation of the output of a surface acoustic wave-matched filter.
Figure 9B:
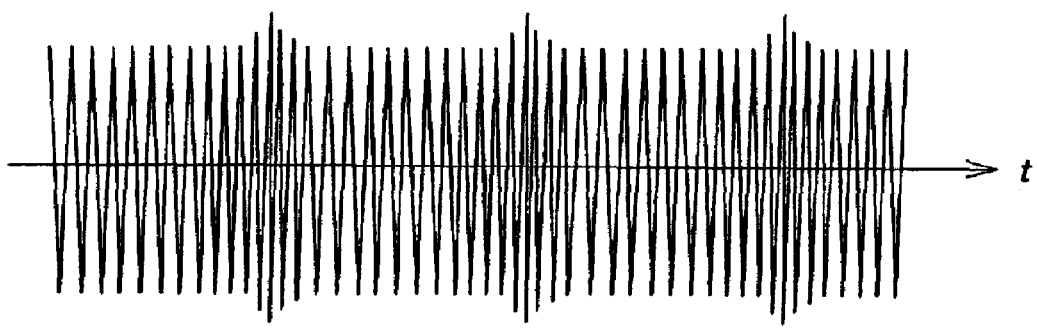

That is, the signal including the correlation peak output from the surface acoustic wave matched filter 26 is supplied to a carrier generator 51. As shown in FIG. 9A, the signal including the correlation peak has an extremely large amplitude when the correlation peak is detected, but it has extremely small amplitude at the time except the detection of the correlation peak. Therefore, in the carrier generator 51, the signal including the correlation peak is amplified with a limiter amplifier at the time of and except the detection of the correlation peak, as shown in FIG. 9B, and the gain thereof is controlled. Thereafter, the signal is passed through a bandpass filter having a bandpass of 2.484 GHz, and thereby, the carrier having a center frequency of 2.484 GHz is generated. Besides the above construction, the carrier generator 51 may have another construction only if the generator 51 can reproduce the carrier of the received signal. However, since the correlation peak has an extremely short period of about 45 nsec in the above embodiment, for downsizing the circuit and operating stably, it is preferable that the signal including the correlation peak is converted to a narrow-band modulation wave, and thereafter, the converted modulation wave is demodulated in narrow-band.

The thus generated carrier is combined with the orthogonal code with the chip synchronization generated in the orthogonal code-generator 29 at a first multiplier 52. The combined signal is multiplied by the code division multiple access signal received at a second multiplier 53, and the output signal is supplied to a integrator 54 to demodulate the original baseband data.

Although the present invention was described in detail with reference to the above examples, this invention is not limited to the above disclosure and every kind of variation and modification may be made without departing from the scope of the present invention. For example, it is apparent that the numerical values in the above embodiments are exemplified and this invention is not limited to the numerical values. For example, in the receiver shown in FIGS. 5 and 7, the signal from the antenna, that is, the signal having the center frequency of about 2.4 GHz is introduced into the SAW MF via the branching filter and the amplifier. Since the receiver does not require the down converting, advantageously, the whole circuit can be easily fabricated. In the embodiments shown in FIGS. 5 and 7, since the SAW MF including an aluminum nitride film as its component can detect directly from the spectrum-spread signal of 2.4 GHz, the above receiver can be realized. If the signal from the antenna is multiplied by a sine wave signal having a given frequency, the center frequency of the thus obtained signal being down-converted, and is treated by the same manner as in the embodiments shown in FIGS. 5 and 7, the same effect as in the above embodiments can be obtained. In this case, the circuit for the down converting is required. In employing the down-converted signal, it is required that the center frequency of the SAW MF coincide with the carrier frequency of the down-converted signal.

Moreover, in the above embodiments, the synchronization code sequence in the preamble division is composed of the Barker code of 11 chips, and the orthogonal code in the data division is composed of the orthogonal m-sequential code of 64 chips. However, the synchronization code sequence in the preamble division and the orthogonal code in the data division may be composed of a m-sequential code of 15-chip m-sequential code and the orthogonal m-sequential code, respectively. Moreover, the synchronization code sequence in the preamble division and the orthogonal code in the data division may be composed of the Barker code of 11 chips and the orthogonal Walsh code, respectively. Then, the synchronization code sequence in the preamble division and the orthogonal code in the data division may be composed of the m-sequential code and the orthogonal Walsh code, respectively. Furthermore, the orthogonal code may be composed of the orthogonal Gold code.

In the above embodiments, although the preamble division has the plural synchronization code sequence, it may have only one synchronization code sequence if the period of the synchronization burst in the preamble division is set equally to be the period of the symbol in the data division.

Moreover, although in the above embodiments, each synchronization code sequence constituting the plural synchronization bursts in the preamble division has the same construction, it may have different construction one another. In this case, plural surface acoustic wave matched filters, each having different construction, are employed for identifying the plural synchronization code sequences having different constructions. Then, if the correlation peak of one from among the plural synchronization code sequences is detected by one of the plural surface acoustic wave matched filters, the orthogonal code can be generated at the start timing of the data division. By employing the plural synchronization code sequences, each having different construction, the chip synchronization can be attained precisely at a high speed under various environment.

Moreover, although in the above embodiments in which the preamble division has the plural synchronization burst, each synchronization burst has only one synchronization code sequence, it may have plural synchronization code sequences. In this case, the plural synchronization code sequences may have the same construction or a different constructions.

As mentioned above, according to the code division multiple access communication system of the present invention in which the preamble division has the plural synchronization code sequences, the chip synchronization can be attained by detecting the correlation peak of one from among the plural synchronization code sequences. Therefore, the chip synchronization can be attained precisely at a high speed under a bad environment, and the dropout of the whole packet can be prevented extensively.

Furthermore, according to the code division multiple access of the synchronization burst including the synchronization code sequence in the preamble division is set to be integral times as long as particularly equal to, the period of the symbol in the data division, since the orthogonal code can be generated in accordance with the start timing of the symbol in the data division by detecting the correlation peak of one from among the plural synchronization code sequences in the preamble division, the chip synchronization can be attained precisely.

Moreover, according to the code division multiple access communication system of the present invention in which the baseband data is demodulated on the carrier generated in the mobile station independently, since it is not required that the carrier is generated from the received signal at the antenna, the baseband data can be demodulated precisely.

What is claimed is:

1. A code division multiple access communication system in which in a transmitter, a code division multiple signal, composed of a data division obtained by multiplying a baseband data and an orthogonal code and a preamble division including synchronization code sequences to attain the chip synchronization of the orthogonal code in a receiver, is modulated with a carrier having a given center frequency and transmitted, and in the receiver, a correlation peak is detected from among the synchronization code sequences in the preamble division by a surface acoustic wave matched filter and the baseband data in the data division is demodulated by the orthogonal code generated on the detection timing, wherein the period of the synchronization burst, in the preamble division ($T_{burst}$), which is composed of a synchronization packet division having at least one synchronization code sequence and a dummy division next to the packet division, is set equally to the period of one symbol in the data division ($T_{symbol}$).

2. A code division multiple access communication system as defined in claim 1, wherein the preamble division has plural synchronization bursts.

3. A code division multiple access communication system as defined in claim 2, wherein the repeated number of the plural synchronization bursts in the preamble division is set to 5–15.

4. A code division multiple access communication system as defined in claim 3, wherein the repeated number of the plural synchronization bursts in the preamble division is set to 6–12.

5. A code division multiple access communication system as defined in claim 1, wherein the chip rate of the synchronization code sequence in the preamble division is higher than the chip rate of the orthogonal code in the data division.

6. A code division multiple access communication system as defined in claim 5, wherein the chip rate of the synchronization code sequence in the preamble division is integral times of not less than two as high as the chip rate of the orthogonal code in the data division.

7. A code division multiple access communication system as defined in claim 1, wherein the chip length of the orthogonal code in the data division is set to be 64 chips.

8. A code division multiple access communication system in which in a transmitter, a code division multiple access signal, composed of a data division obtained by multiplying a baseband data and an orthogonal code and a preamble division including synchronization code sequences to attain the chip synchronization of the orthogonal code in a receiver, is modulated with a carrier having a given center frequency and transmitted, and in the receiver, a correlation peak is detected from among the synchronization code sequences in the preamble division by a surface acoustic wave matched filter and the baseband data in the data division is demodulated by the orthogonal code generated on the detection timing, wherein the preamble division has plural synchronization code sequences, and the surface acoustic wave matched filter detects the correlation peak of at least one from among the plural synchronization code sequences and generates the orthogonal code on the detection timing of the correlation peak; and wherein the preamble division is composed of $N_{burst}$-multiple repeated synchronization bursts, each burst being composed of a synchronization packet division having at least one synchronization code sequence and a dummy division next to the packet division, and the period of one synchronization burst ($T_{burst}$) is set to be integral times as long as the period of one symbol in the data division ($T_{symbol}$).

9. A code division multiple access communication system as defined in claim 8, wherein the surface acoustic wave matched filter has an aluminum nitride film as its component.

10. A code division multiple communication access system as defined in claim 9, wherein the period of the burst in the preamble division ($T_{burst}$) is set equally to the period of one symbol in the data division ($T_{symbol}$).

11. A code division multiple communication access system as defined in claim 9, wherein the multiple repeated number $N_{burst}$ of the plural bursts constituting the preamble division is set to 5–15.

12. A code division multiple communication access system as defined in claim 11, wherein the multiple repeated number $N_{burst}$ of the plural bursts constituting the preamble division is set to 6–12.

13. A code division multiple access communication system as defined in claim 9, wherein the chip rate of the synchronization code sequence in the preamble division is higher than the chip rate of the orthogonal code in the data division.

14. A code division multiple access communication system as defined in claim 13, wherein the chip rate of the synchronization code sequence in the preamble division is integral times of not less than two as high as the chip rate of the orthogonal code in the data division.

15. A code division multiple access communication system as defined in claim 9, wherein the chip length of the orthogonal code in the data division is set to 64 chips.

16. A code division multiple access communication system in which in a transmitter, a code division multiple signal, composed of a data division obtained by multiplying a baseband data and an orthogonal code and a preamble division including synchronization code sequences to attain the chip synchronization of the orthogonal code in a receiver, is modulated with a carrier having a given center frequency and transmitted, and in the receiver, a correlation peak is detected from among the synchronization code sequences in the preamble division by Ma surface acoustic wave matched filter and the baseband data in the data division is demodulated by the orthogonal code generated on the detection timing, wherein in the receiver, the orthogonal code which is generated on the detection timing of the ion peak in the surface acoustic wave matched filter is multiplied by the received code division multiple signal to generate a narrow-band modulation signal, and the generated narrow-band modulation signal is demodulated by a carrier generated from a local oscillator provided in the receiver to reproduce the original baseband data; and wherein the preamble division is composed of multiple repeated synchronization bursts, each burst being composed of a synchronizaton packet division having at least one synchronization code sequence and a dummy division next to the packet division, and the period of one synchronization burst ($T_{burst}$) is set to be integral times as long as the period of the symbol in the data division ($T_{symbol}$).

17. A code division multiple access communication system as defined in claim 16, wherein the local oscillator provided in the receiver generates the carrier having the frequency equal to the center frequency of the carrier generated in the transmitter, and the generated carrier from the local oscillator is multiplied by the narrow-band modulation signal to demodulate the baseband data.

18. A code division multiple access communication system as defined in claim 16, wherein the local oscillator provided in the receiver generates a carrier having a different frequency from the center frequency of the carrier generated in the transmitter, the generated carrier from the local oscillator being multiplied by the narrow-band modulation signal to generate a narrow-band modulation signal having their differential frequency, and the narrow-band modulation signal having the differential frequency is demodulated to demodulate the baseband data.

19. A code division multiple access communication system as defined in claim 16, wherein the period of one synchronization burst ($T_{burst}$) is set equally to the period of one symbol in the data division ($T_{symbol}$).

20. A code division multiple access communication system as defined in claim 19, wherein the repeated number of the plural synchronization bursts in the preamble division is set to 5–15.

21. A code division multiple access communication system as defined in claim 20, wherein the repeated number of the plural synchronization bursts in the preamble division is set to 6–12.

22. A code division multiple access communication system as defined in claim 16, wherein the chip rate of the synchronization sequence in the preamble division is set to be higher than the chip rate of the orthogonal code in the data division.

23. A code division multiple access communication system as defined in claim 22, wherein the chip rate of the synchronization sequence in the preamble division is set to be integral times of not less than two as high as the chip rate of the orthogonal code in the data division.

24. A code division multiple access communication system as defined in claim 16, wherein the chip length of the orthogonal code in the data division is set to 64.

* * * * *